United States Patent [19]

Godwin et al.

[11] 4,422,028

[45] Dec. 20, 1983

[54] BRUSHLESS EXCITATION SYSTEM WITH A HOLDING CURRENT RESISTOR

[75] Inventors: Gurney L. Godwin; Alvin M. Vance, both of Georgetown, Tex.

[73] Assignee: Westinghouse Electric Corp., Pittsburgh, Pa.

[21] Appl. No.: 262,737

[22] Filed: May 12, 1981

[51] Int. Cl.³ .............................................. H02P 5/40
[52] U.S. Cl. .................................................... 318/718
[58] Field of Search ............... 318/718, 717, 719, 712, 318/713, 714, 715, 716

[56] References Cited

U.S. PATENT DOCUMENTS

| | | | |
|---|---|---|---|
| 3,463,987 | 8/1969 | Schlicher | 318/718 |
| 3,509,439 | 4/1970 | Schicht | 318/718 |
| 3,599,236 | 8/1971 | Hutchins | 318/718 |
| 3,667,014 | 5/1972 | Merhof et al. | 318/715 |
| 3,798,522 | 3/1974 | Pisecker | 318/718 |
| 4,315,202 | 2/1982 | Dawson et al. | 318/718 |

Primary Examiner—David Smith, Jr.
Attorney, Agent, or Firm—G. H. Telfer

[57] ABSTRACT

A brushless excitation system for a synchronous motor with a holding current resistor connected across the motor field winding to insure turning on of a semiconductor excitation control switch due to a gating pulse of limited duration.

8 Claims, 1 Drawing Figure

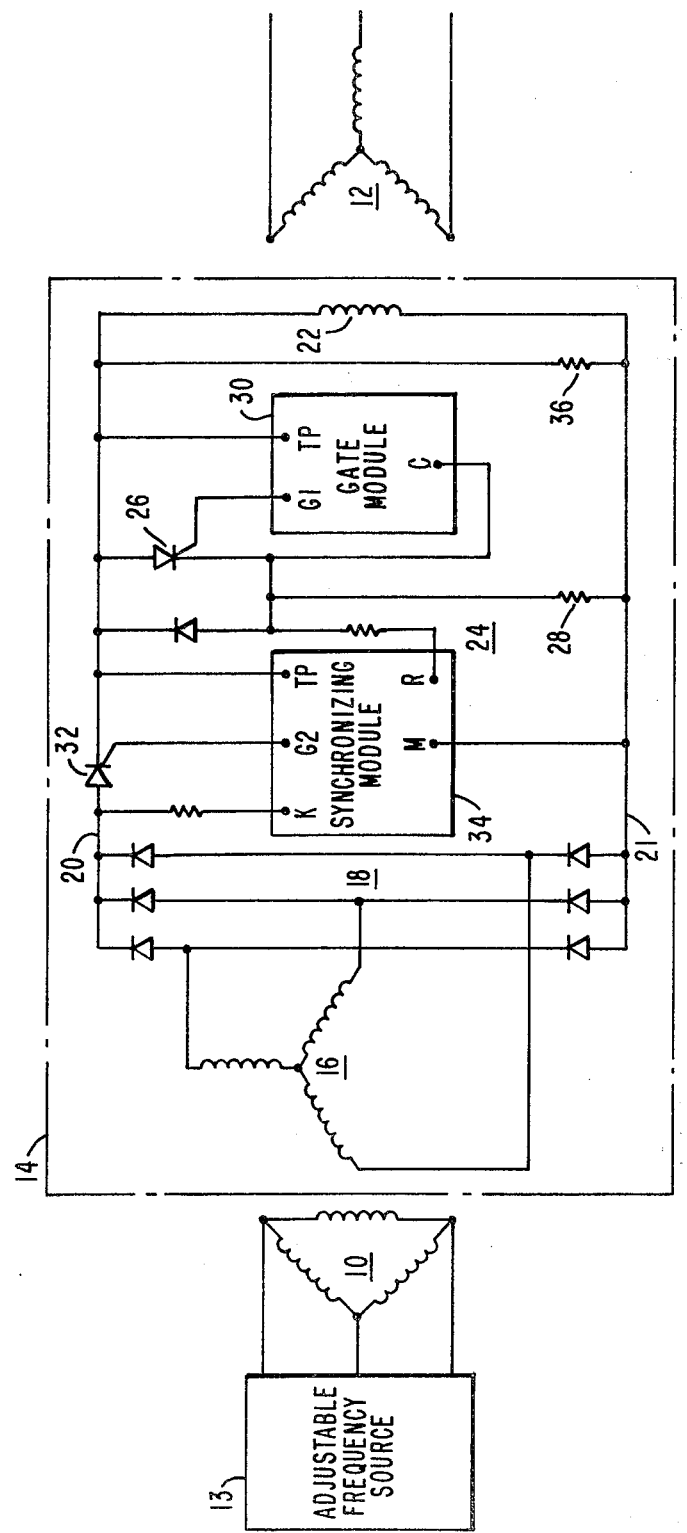

BRUSHLESS EXCITATION SYSTEM WITH A HOLDING CURRENT RESISTOR

BACKGROUND AND SUMMARY OF THE INVENTION

This invention relates to brushless excitation systems for synchronous dynamoelectric machines such as synchronous motors.

The type of system on which the present invention improves is represented by the following patents: Frola- U.S. Pat. No. 3,405,338; Hoffmann-U.S. Pat. No. 3,385,195; Hoffmann et al.- U.S. Pat. No. 3,414,788; Hoffmann: U.S. Pat. No. 3,470,435; Hoffmann- U.S. Pat. No. 3,748,555; Heyne- 3,845,369; and, Godwin et al. U.S. Pat. No. 3,959,702, the teachings of which are herein incorporated by reference.

The prior known system is generally characterized by including an exciter armature winding on a rotating assembly that also includes the synchronous motor field winding which is inductively coupled to the synchronous machine stator winding. Between the exciter armature winding and the motor field winding, and also part of the rotating assembly, are a rectifier and an excitation control system for selectively controlling the application of current therebetween. Representative excitation control systems are extensively described in the aforementioned patents and will not be detailed herein. In part, however, they include an excitation control switch that is directly connected between the rotating rectifier and the rotating field winding and this switch is to be turned on upon predetermined conditions. The excitation control switch is normally a three terminal semiconductor device such as a silicon controlled rectifier a thyristor which has its main anode and cathode terminals connected in the path between the rectifier and the field winding and its gate terminal connected to a gating circuit that applies a predetermined gating pulse for turn-on.

Such systems have been made and widely used with considerable success. While the general design of the control system permits various modifications for specific conditions to ensure that the gating pulse is of the proper character for reliable turn-on, it is desirable to permit the use of a standardized synchronization control system, packaged as a module, in a variety of conditions. This has been achieved in the past where the excitation voltage, applied to the exciter stationary winding, is DC. However, in instances where the same motor and excitation control system is for the application to adjustable frequency operation, such as having the ability to perform at various frequencies in a range of perhaps of 0 to 66 Hertz, there is an effect on the excitation control system that may impair reliable performance. This is a consequence if the motor field winding has an inherent inductance that is so high that the gate pulse from a standard synchronizing circuit module will not turn on the SCR. This is because the field current will not build up to the necessary holding value for the SCR during the length of the gate pulse. Instead, the field current goes out and the next gate pulse only repeats the process.

It is desirable to provide a simple and economical way to ensure that the excitation control SCR is turned on the first gate pulse. In doing so, it is preferred not to have to modify the gating circuit or other aspects of the synchronizing control circuit in any significant respect. The present invention accomplishes these purposes merely by providing a resistor, referred to herein as a holding current resistor, connected in parallel directly across the field winding. The holding current resistor is only of moderate size such as about 50 to about 150 ohms, typically about 100 ohms, for synchronous motor systems of principal interest. Since such systems are provided with a starting resistance or discharge resistance, such as resistor 68 of FIG. 1 of Frola U.S. Pat. No. 3,405,338, that is in a large number of parallel resistor strands, it is a simple matter either in manufacture or in the field to take one resistive strand of the starting resistor and reconnect it directly across the field winding as a holding current resistor. The magnitude and character of the holding current resistor is such that it does not impair to any significant degree the operation of the synchronous motor or result in undue losses. It is merely necessary to achieve a sufficient holding current of say, approximately 1 ampere, through the SCR to ensure its reliable turning on on a single gate pulse.

The inventive combination is useful generally in the excitation systems characterized by having a thyristor type excitation control switch. It is particularly useful where the excitation voltage is from a variable frequency source, as is sometimes used for energy conservation.

THE DRAWING

The single FIGURE is a circuit schematic of a brushless excitation synchronous motor control system in accordance with an embodiment of the present invention.

PREFERRED EMBODIMENTS

Consistent with the foregoing, and referring to the FIGURE, apparatus is shown comprising a stationary exciter field winding 10 and a stationary synchronous motor stator winding 12 between which is a rotatable assembly 14. A source 13 energizes the exciter field 10 with DC or AC, including variable frequency AC voltage. In this example, winding 10 is a three phase winding energized from an adjustable frequency source 13.

The rotatable assembly 14, per the aforementioned patents, comprises an exciter armature winding 16, depicted in a normal three-phase configuration, with each phase conductively connected to a rectifier 18 for full wave rectification producing DC on the main lines 20 and 21 connected between the rectifier 18 and a rotating motor field winding 22. Between the rectifier 18 and the motor field winding 22 are the various elements collectively referred to as the excitation control system 24 for determining application of the excitation current from the rectifier 18 to the field winding 22 at the proper time. The aforementioned patents provide further information on the configuration of suitable control systems such as that shown.

It will be seen from the Figure that the system 24 includes an SCR 26 that is connected in a circuit branch across the field winding 22 in series with a starting resistor (sometimes referred to as a discharge resistor) 28 and has its control applied by a gate module 30 to its gate electrode. Additionally, an SCR 32 is directly connected in the line 20 between the rectifier 18 and the field winding 22 and is connected to a synchronizing module 34 which includes a gating circuit for application of signals to its gate electrode. It is the performance and operation of this latter SCR 32 that is of particular interest in this invention.

When the synchronizing module 34 is set up for operation, its design normally assumes a single AC frequency in the system if AC is used and such frequency influences the timing of functions of the synchronizing module. However, where the frequency is adjustable, such as for reasons of economizing on power used, the pulse generated by the gating circuit in the synchronizing module 34 may be of insufficient duration to ensure turn-on of the excitation switch, SCR 32. Therefore, in order to avoid modification of the synchronizing module 34, the present invention provides a simple solution by applying a holding current resistance 36 across the field winding 22 directly. The holding current resistance 36 may be of a value of from about 50 ohms to about 150 ohms, typically and preferably of about 100 ohms, in order to produce about 1 ampere of holding current that will ensure turn-on of SCR 32 in response to a gating pulse.

The implementation of the system is simply afforded by reason of the fact that the starting resistor 28 shown as connected in series with the first-mentioned SCR 26 comprises a plurality of parallel resistive strands. Without impairment of the resistance of the starting resistor to any noticeable degree, a single strand of such starting resistor may be reconnected as the holding current resistor 36 directly across the field winding. Of course, in addition, a separate holding current resistor of appropriate value may be connected without any modification of the starting resistor.

Resistor 36 modifies the circuit only to the extent of avoiding the high inductance of motor field winding 22 from limiting the build-up of current to the holding level required for the SCR 32. This permits getting the field turned on at standstill which has been sometimes found to be a problem, depending on the source frequency.

By way of example, the invention has been applied to a synchronous motor producing 8000 Hp at 1200 rpm in a system with a 60 KVA exciter that is supplied from a source that is adjustable over a range of from 0 to 66 Hz and has been found to produce reliable performance.

It is therefore seen that the present invention provides a simple and economical solution to a problem of existing apparatus and permits greater flexibility of utilization of that apparatus without introduction of applicable additional costs.

What we claim is:

1. A brushless excitation system for a synchronous dynamoelectric machine comprising:
    a stationary exciter field winding;
    a rotor assembly including:
        an exciter armature winding inductively coupled to the exciter field winding,
        a rectifier connected to the exciter armature winding,
        a synchronous dynamoelectric machine field winding connected in circuit with said rectifer, and
        an excitation control system for controlling the application of excitation current from said rectifier to said field winding, said control system including in part a semiconductor switch requiring a minimum holding current for reliable turn-on in response to a predetermined gating signal, and
        a holding current resistor connected across said field winding for insuring conduction of sufficient holding current to reliably turn on said semiconductor switch.

2. A brushless excitation system in accordance with claim 1 wherein: said semiconductor switch is a silicon controlled rectifier and said holding resistor is connected to a first point directly between said switch and one end of said field winding and a second point directly at the other end of said field winding.

3. A brushless excitation system in accordance with claim 1 wherein: said holding current resistor has a resistance value of between about 50 ohms and about 150 ohms.

4. A brushless excitation system in accordance with claim 1 wherein: said field winding has an inductance which in the absence of the holding current resistor prevents reliable building up of holding current through said switch during application thereto of a gating pulse and the parallel combination of the field winding and the holding current resistor exhibits a reduced inductance to reliably permit building up of holding current through said switch.

5. A brushless excitation system in accordance with claim 1 wherein: said stationary exciter field winding is coupled to and supplied from an adjustable frequency source.

6. A brushless excitation system in accordance with claim 1 wherein:
    said stationary exciter field winding is coupled to and supplied from a source that has an adjustable frequency over a range;
    said excitation control system includes said semiconductor switch in a direct series path between said rectifier and said field winding and also includes a synchronizing module for providing a turn-on pulse to a gate electrode of said semiconductor switch; and
    said holding current resistor and said field winding in parallel combination exhibit an inductance that is less than that of said field winding alone and ensures the turning on of said semiconductor switch in response to a turn-on pulse provided by said synchronizing module regardless of the particular frequency within said range that said source is supplying.

7. A brushless excitation system in accordance with claim 6 wherein:
    said range of said source is from zero to sixty-six hertz.

8. A brushless excitation system in accordance with claim 6 wherein:
    said holding current resistor has a resistance between about 50 ohms and about 150 ohms and is a single strand condutor.

* * * * *